(12) United States Patent
Zhu et al.

(10) Patent No.: US 10,114,603 B2
(45) Date of Patent: Oct. 30, 2018

(54) DATA INTERACTION DISPLAY SYSTEM AND METHOD

(71) Applicant: NANJING IOT SENSOR TECHNOLOGY CO.,LTD., Nanjing (CN)

(72) Inventors: Jungang Zhu, Nanjing (CN); Feng Zhu, Nanjing (CN); Junling Zhu, Nanjing (CN); Jianmei Yu, Nanjing (CN)

(73) Assignee: NANJING IOT SENSOR TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 15/555,083

(22) PCT Filed: Jan. 26, 2016

(86) PCT No.: PCT/CN2016/072120
§ 371 (c)(1),
(2) Date: Sep. 1, 2017

(87) PCT Pub. No.: WO2016/138804
PCT Pub. Date: Sep. 9, 2016

(65) Prior Publication Data
US 2018/0260186 A1    Sep. 13, 2018

(30) Foreign Application Priority Data

Mar. 2, 2015 (CN) .......................... 2015 1 0093337

(51) Int. Cl.
*G06F 3/041*    (2006.01)
*G06F 3/14*    (2006.01)
(Continued)

(52) U.S. Cl.
CPC ............ *G06F 3/1454* (2013.01); *G06F 1/163* (2013.01); *G06F 3/041* (2013.01); *G06F 3/0488* (2013.01);
(Continued)

(58) Field of Classification Search
CPC combination set(s) only.
See application file for complete search history.

(56) References Cited

U.S. PATENT DOCUMENTS 9,307,396 B2 *   4/2016   Jung .................. H04W 4/02
9,560,042 B2 *   1/2017   Okazaki ............. G06F 1/1616
(Continued)

FOREIGN PATENT DOCUMENTS

| CN | 202230483 U | 5/2012 |
|---|---|---|
| CN | 104301528 A | 1/2015 |
| CN | 104679334 A | 6/2015 |

*Primary Examiner* — Van N Chow
(74) *Attorney, Agent, or Firm* — Gokalp Bayramoglu

(57) ABSTRACT

The invention discloses a data interactive display system and method, which comprises a smart wearable terminal and a display device. The smart wearable terminal includes a first NFC module, a first microprocessor, a first touch screen and a first data interaction module, wherein the first microprocessor is connected with the other three parts respectively. The display device includes a second NFC module, a second microprocessor, a second touch screen and a second data interaction module, wherein the second microprocessor is connected with the other three parts respectively. The first touch screen and the second touch screen achieve real-time synchronization between the displayed data and touch commands through a communication link established by the first data interaction module and the second data interaction module.

10 Claims, 2 Drawing Sheets

(51) Int. Cl.
  *G06F 3/0488* (2013.01)
  *H04W 76/10* (2018.01)
  *G06F 1/16* (2006.01)
  *H04L 29/08* (2006.01)
  *H04W 84/12* (2009.01)
  *H04W 4/80* (2018.01)

(52) U.S. Cl.
  CPC ......... *H04L 67/1095* (2013.01); *H04W 76/10* (2018.02); *H04W 4/80* (2018.02); *H04W 84/12* (2013.01)

(56) References Cited

U.S. PATENT DOCUMENTS 9,646,307 B2 * 5/2017 Candelore ............ G06Q 20/352
9,940,498 B2 * 4/2018 Vissa .................... G06F 1/3234

* cited by examiner

DATA INTERACTION DISPLAY SYSTEM AND METHOD

CROSS REFERENCE TO RELATED APPLICATION

This application is the national phase entry of International Application No. PCT/CN2016/072120, filed on Jan. 26, 2016, which is based upon and claims priority to Chinese Patent Application No. 201510093337.6, filed on Mar. 2, 2015, the entire contents of which are incorporated herein by reference.

TECHNICAL FIELD

The invention belongs to the field of man-machine interaction technology, specifically relating to a system and method for ensuring a smart wearable terminal and a display device to have interactive data communication.

BACKGROUND

As society develops and people's living standard rises, smart watch is available to general public. Currently, smart watch is generally used together with smartphone or tablet computer to share information such as short message, call and email. However, these are only for temporary needs while unable to reach people's higher needs. As the screen of smart watch is too small for complex information, the device with bigger screen such as smartphone or tablet computer is needed. Such device shares overlapping functions with smart watch.

Various smart electronic products such as computer, tablet computer and laptop computer, which have become necessary for work and life, have been gradually applied in public places for use. However, consumers' private or financial information may be stored on these electronic devices when consumers use them. These electronic devices may become impractical and a waste of resources due to such security problem.

Along with a greater variety of functions, smart watch may gradually replace large-size electronic devices such as smartphone and tablet computer. However, the small screen of smart watch has been a technical challenge for those skilled in the art.

SUMMARY

The present invention aims at providing a data interactive display system and method to solve the problem of smart wearable terminal (e.g. smart watch) whose screen is too small for displaying complex information in prior art as well as the data security problem faced by consumers when they use free electronic devices in public places.

To achieve the foregoing objectives, the data interactive display system and method of the present invention comprises:

a smart wearable terminal and a display device, wherein the smart wearable terminal includes a first NFC module, a first microprocessor, a first touch screen and a first data interaction module, and the first microprocessor is connected with the other three parts respectively;

the first NFC module, senses a second NFC module within the surrounding area, transmits address parameters with the connected second NFC module, and sends the received address parameters to the first microprocessor, thereby ensuring the smart wearable terminal to match with the display device;

the first touch screen, receives commands from external touch, and displays data information;

the first microprocessor, controls the first data interaction module to establish a communication link with a second data interaction module based on the received address parameters, sends data information displayed on the first touch screen to the second data interaction module, and processes touch commands received by the first touch screen as well as data information received by the first data interaction module;

the first data interaction module, establishes a communication link with the second data interaction module, sends data information displayed on the first touch screen to the second data interaction module, and receives touch commands, which are sent by the second data interaction module and received by a second touch screen;

the display device includes a second NFC module, a second microprocessor, a second touch screen and a second data interaction module, and the second microprocessor is connected with the other three parts respectively;

the second NFC module, senses the first NFC module within the surrounding area, transmits address parameters with the connected first NFC module, and sends the received address parameters to the second microprocessor;

the second touch screen, magnifies and displays the received data information that is displayed on the first touch screen, receives commands from external touch, and sends the received touch commands to the second microprocessor;

the second microprocessor, controls the second data interaction module to establish a communication link with the first data interaction module based on the received address parameters, and analyzes and processes touch commands received by the second touch screen;

the second data interaction module, sends touch commands that are received by the second touch screen and processed by the second microprocessor to the first data interaction module, and receives data information, which is sent by the first data interaction module and displayed on the first touch screen;

the first touch screen and the second touch screen establish a communication link through the first data interaction module and the second data interaction module to achieve real-time synchronization between the displayed data and touch commands.

Preferably, the address parameters transmitted between the first NFC module and the second NFC module are the address parameters of the first data interaction module and the second data interaction module.

Preferably, the first data interaction module and the second data interaction module adopt WiFi or Bluetooth wireless communication protocol.

Preferably, the size of the second touch screen of the display device is bigger than that of the first touch screen of the smart wearable terminal.

Preferably, the display device charges the smart wearable terminal through its charging port or the second NFC module.

A data interactive display method of the present invention based on the data interactive display system, comprises the steps of:

step 1: matching the smart wearable terminal with the display device;

step 2: activating the first data interaction module and the second data interaction module, and ensuring them to establish a communication link;

step 3: the smart wearable terminal sending real-time data information displayed on the first touch screen to the display device through the communication link;

step 4: the second touch screen of the display device, magnifying and displaying the received data information that is displayed on the first touch screen;

step 5: the second touch screen, receiving and sending commands from external touch to the second microprocessor for analysis and processing, and then the second microprocessor transmitting the processed touch commands to the smart wearable terminal through the communication link;

step 6: the smart wearable terminal, executing corresponding commands and actions according to the received touch commands transmitted from the display device, and then returning to step 3.

Preferably, the data interaction method further includes that the smart wearable terminal identifies whether the communication link is connected in real time, and if the communication link is connected, the smart wearable terminal and the display device keep interactive data communication, and if the communication link is disconnected, the smart wearable terminal controls the first data interaction module to stop transmitting data information displayed on the first touch screen.

Preferably, the step 1 further includes, keeping the smart wearable terminal close to the display device, and ensuring the first NFC module and the second NFC module to establish a quick connection to transmit parameters that are necessary for connecting to WiFi or Bluetooth.

Preferably, the step 4 further includes that the size of the second touch screen of the display device is bigger than that of the first touch screen of the smart wearable terminal, and the display device magnifies and encodes the received data information that is displayed on the first touch screen through the second microprocessor, ensuring the data information to accord with what is displayed on the second touch screen, thereby the data information displayed on the first touch screen is magnified.

According to the data interactive display system and method of the present invention, the first NFC module and the second NFC module, after quick connection, transmit parameters that are necessary for connecting to WiFi or Bluetooth. After the communication link between the smart wearable terminal and the display device is established, the display device displays data information which is displayed on the smart wearable terminal in real time, and sends the received touch commands to the smart wearable terminal for processing. Then the smart wearable terminal executes corresponding commands and actions.

The method has the advantages of:

1. realizing quick connection between the smart wearable terminal and the display device;

2. ensuring data information displayed on the smart wearable terminal to be displayed on the large size screen of the display device in real time, and ensuring users to touch the display device to control the smart wearable terminal;

3. avoiding data security risks during the use of public electronic devices;

4. providing smart watch charging port, which is user-friendly.

DETAILED DESCRIPTION OF THE EMBODIMENTS

In order to make it easier for those skilled in the art to understand, the following further describes the present invention with reference to an embodiment and the accompanying drawings. The following description of the embodiment is merely a part rather than all of the present invention.

Figure 1:
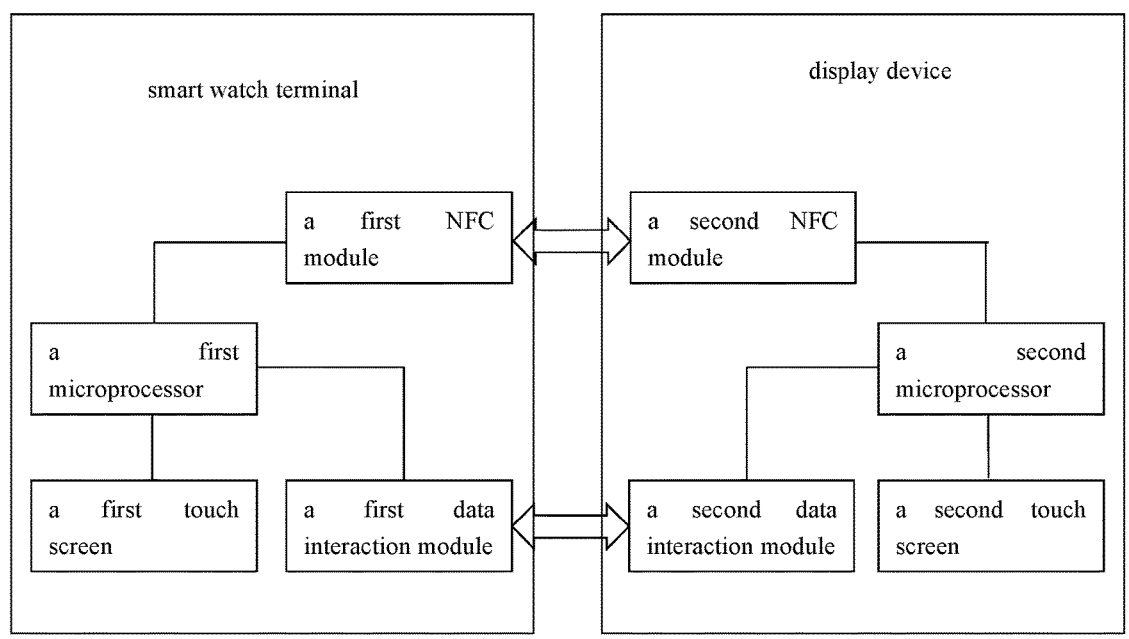
FIG. 1 is a block diagram of a data interactive display system of the present invention.

As shown in FIG. 1, a data interactive display system of the present invention comprises a smart watch terminal and a display device. The smart watch terminal and the display device have interactive data communication. Data information of the smart watch terminal is displayed on the large size screen of the display device, and users are able to touch the display device to control the smart watch terminal. The system avoids data security risks during the use of public electronic devices (e.g. desktop computer, tablet computer and laptop computer), wherein the smart watch terminal, includes a first NFC module, a first microprocessor, a first touch screen and a first data interaction module, and the first microprocessor is connected with the other three parts respectively;

the first NFC module, senses radio-frequency signals within the surrounding area, establishes a quick connection with a second NFC module when radio-frequency signals generated by the second NFC module of the display device are detected, transmits address parameters with the connected second NFC module, and sends the received address parameters to the first microprocessor, thereby ensuring the smart watch terminal to match with the display device;

the address parameters specifically refer to the address parameters of the first data interaction module and the second data interaction module;

the first touch screen, receives commands from external touch, and displays data information;

the first microprocessor, controls the first data interaction module to establish a communication link with a second data interaction module based on the received address parameters, sends data information that is displayed on the first touch screen to the second data interaction module, and processes touch commands received by the first touch screen as well as touch commands received by the second touch screen, which are transmitted from the second data interaction module to the first data interaction module;

the first data interaction module, establishes a communication link with the second data interaction module, sends data information displayed on the first touch screen to the second data interaction module, and receives touch commands, which are sent by the second data interaction module and received by a second touch screen; the first data interaction module adopts WiFi or Bluetooth wireless communication protocol;

the display device includes a second NFC module, a second microprocessor, a second touch screen and a second data interaction module, and the second microprocessor is connected with the other three parts respectively;

the second NFC module, senses the first NFC module within the surrounding area, transmits address parameters with the connected first NFC module, and sends the received address parameters to the second microprocessor; the address parameters specifically refer to the address parameters of the first data interaction module and the second data interaction module;

the second touch screen, whose size is bigger than that of the first touch screen of the smart watch terminal, magnifies and displays the received data information that is displayed on the first touch screen, receives commands from external touch, and sends the received touch commands to the second microprocessor;

the second microprocessor, controls the second data interaction module to establish a communication link with the first data interaction module based on the received address parameters of the first data interaction module, and analyzes and processes the received data information that is displayed on the first touch screen, controls the second touch screen to display the data information, and analyzes touch commands received by the second touch screen;

the second data interaction module, sends touch commands that are received by the second touch screen and processed by the second microprocessor to the first data interaction module, and receives data information that is sent by the first data interaction module and displayed on the first touch screen; the second data interaction module adopts WiFi or Bluetooth wireless communication protocol;

the first touch screen and the second touch screen achieve real-time synchronization between the displayed data and touch commands through a communication link established by the first data interaction module and the second data interaction module.

According to the data interactive display system of the present invention, when a user keeps the smart watch terminal close to the display device, the first NFC module and the second NFC module, after quick connection, exchange WiFi address parameters (or Bluetooth address parameters in other embodiments). The smart watch terminal and the display device activate the first data interaction module and the second data interaction module respectively to establish WiFi communication link. The second data interaction module sets up AP mode and allows WiFi connection with the first data interaction module after receiving the interrogation signal sent by the first data interaction module. The smart watch terminal sends data information displayed on the first touch screen to the display device for magnifying and displaying, which is easier for users to see. Meanwhile, the second microprocessor analyzes the user's touch commands, which are received by the second touch screen, and sends analysis results to the smart watch terminal through the second data interaction module. The first microprocessor of the smart watch terminal analyzes the received results and executes corresponding commands and actions according to the results. The first data interaction module sends real-time data information displayed on the first touch screen back to the second data interaction module, thereby the smart watch terminal and the display device achieve interactive data communication. The display device does not need to be equipped with powerful computing and processing function because it is merely taken as a screen for display. The computing and processing of all touch commands and the execution of actions are completed by the smart watch terminal, which ensures data security.

In a more preferred embodiment, the display device in the present invention is equipped with charging port, and charges the smart watch terminal through USB interface. Additionally, the smart watch terminal is also charged when the first NFC module is in close contact with the second NFC module. NFC charging principle is easy for those skilled in the art to understand and has been widely applied, therefore the applicant does not go into details here.

The embodiment takes the smart watch terminal as an example to elaborate how the smart wearable terminal works. With the rapid development of electronic technology, the smart wearable terminal of the present invention includes not only smart watches but also other wearable products such as smart shoes, smart belts and smart buttons.

Figure 2:
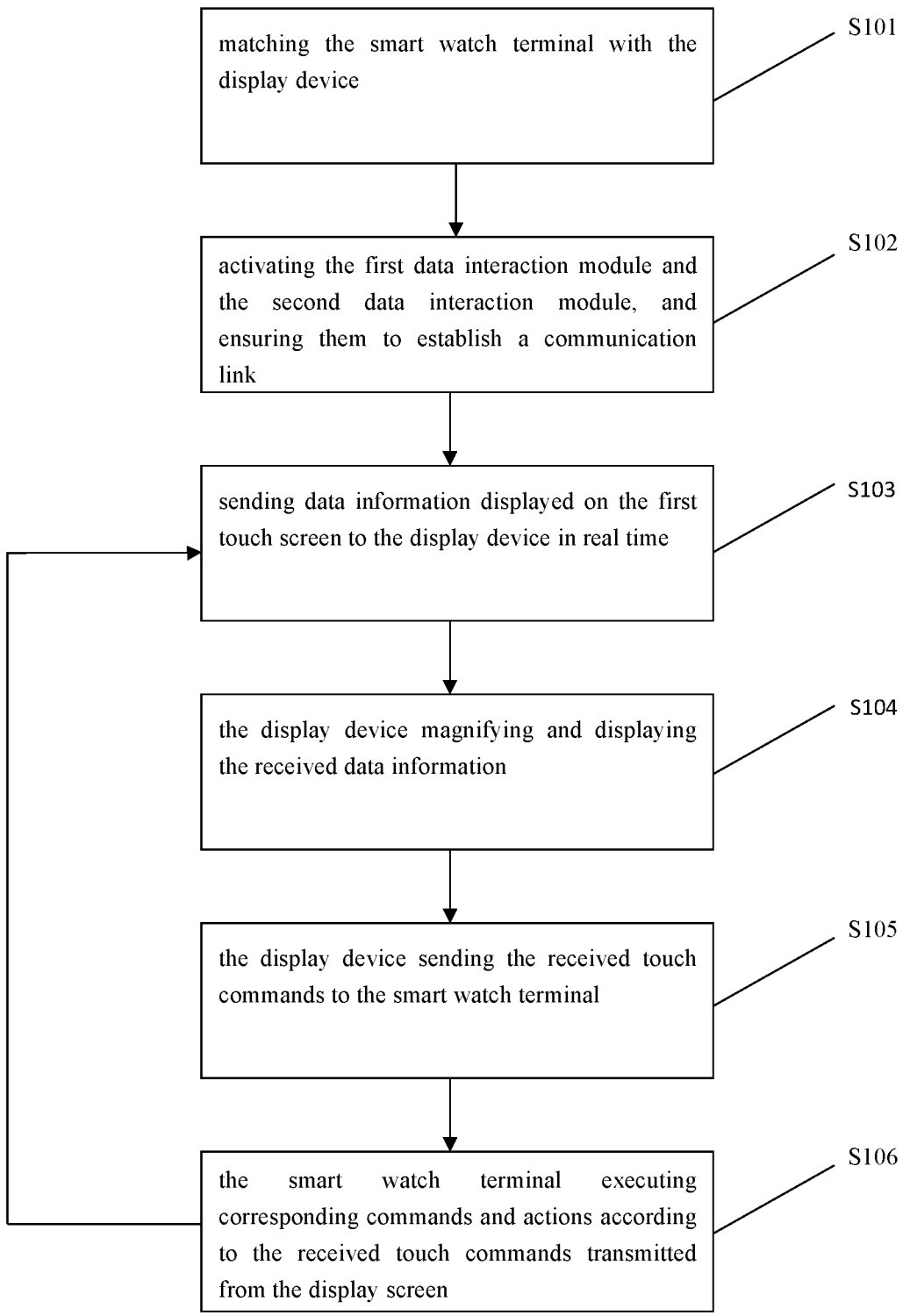
FIG. 2 is a flow chart of a data interactive display method of the present invention.

As shown in FIG. 2, a data interactive display method of the present invention based on the data interactive display system, ensuring data information displayed on the smart watch terminal to be magnified on a large size screen through wireless transmission, comprises the steps of:

step 101 (S101): matching the smart watch terminal with the display device;

the smart watch terminal equipped with operating system, supporting various software programs including internet surfing, game, video, music and office functions, and when the user puts the smart watch terminal close to the display device, the first NFC module of the smart watch terminal and the second NFC module of the display device, after quick connection, completing identification and matching, and exchanging WiFi address parameters (or Bluetooth address parameters in other embodiments).

step 102 (S102): activating the first data interaction module and the second data interaction module, and ensuring them to establish a communication link;

the smart watch terminal and the display device activating the first data interaction module and the second data interaction module respectively, and the second data interaction module setting up AP mode, establishing a WiFi connection and a communication link with the first data interaction module after receiving the interrogation signal sent by the first data interaction module.

step 103 (S103): the smart wearable terminal, sending real-time data information displayed on the first touch screen to the display device through the communication link;

the first microprocessor of the smart watch terminal, encoding data information displayed on the first touch screen, and controlling the first data interaction module to send the processed data information to the second data interaction module through the communication link.

step 104 (S104): the second touch screen of the display device, magnifying and displaying the received data information that is displayed on the first touch screen;

the second microprocessor of the display device, decoding and analyzing the received data information that is displayed on the first touch screen, and controlling the second touch screen to adjust data information to match with the screen size proportionally; (In other words, data information displayed on the second touch screen is same as that displayed on the first touch screen but the difference lies in that data information displayed on the second display screen is scaled up.)

step 105 (S105): the second touch screen, receiving and sending commands from external touch to the second microprocessor for analysis and processing, and then the second microprocessor transmitting the processed touch commands to the smart watch terminal through the communication link;

the user sending touch commands through the display device, and the second microprocessor of the display device analyzing the received touch commands and sending analysis results from the second data interaction module to the first data interaction module through the communication link.

step 106 (S106): the smart watch terminal, executing corresponding commands and actions according to the received touch commands transmitted from the display device, and then returning to step 3;

the first microprocessor of the smart watch terminal, analyzing the received touch commands, and executing corresponding commands and actions according to analysis results; for example, when the user touches "Visit the Website" on the second touch screen in step 105, the smart watch terminal in step 106 executes the program of "Visit the Website" according to the user's touch command, which means that the user's touch operation carried out on the display device is substantially carried out on the smart watch terminal; the first microprocessor sending all page information, when it executes commands and actions, to the second data interaction module in real time, and to be displayed on the display device, then returning to step 103.

In a preferred embodiment, the data interactive display method also includes, when the smart watch terminal and the display device have interactive data communication, the smart watch terminal identifies whether the communication link is connected in real time, and if the communication link is connected, the smart watch terminal and the display device keep interactive data communication, and if the communication link is disconnected, the smart watch terminal controls the first data interaction module to stop transmitting data information displayed on the first touch screen.

The data interactive display system and method of the present invention ensures data information displayed on the smart watch terminal to be displayed and controlled on the large size screen of the display device, therefore users are able to use their smart watches and display devices provided in public places to have entertainment or handle business affairs without carrying large screen electronic devices during a trip or at work. Additionally, users are also able to use their own display devices to display data information and control smart watches.

The present invention can be applied through many approaches. The embodiment described above is only the preferred embodiment of the present invention. It is to be pointed out that any equivalent modification or variation made by those skilled in the art without departing from the spirit and scope of the present invention is to be also included within the scope of the present invention.

What is claimed is:

1. A data interactive display system, comprising a smart wearable terminal and a display device, wherein:
   the smart wearable terminal and the display device have interactive data communication;
   the display device is merely taken as a screen for display;
   the smart wearable terminal is equipped with operating system;
   computing and processing of all touch commands and execution of actions are completed by the smart wearable terminal;
   the smart wearable terminal includes a first NFC module, a first microprocessor, a first touch screen and a first data interaction module, wherein the first microprocessor is connected with the other three parts respectively;
   the first NFC module senses a second NFC module within the surrounding area, transmits address parameters with the connected second NFC module, and sends the received address parameters to the first microprocessor, thereby ensuring the smart wearable terminal to match with the display device;
   the first touch screen receives commands from external touch, and displays data information;
   the first microprocessor controls the first data interaction module to establish a communication link with a second data interaction module based on the received address parameters, sends data information displayed on the first touch screen to the second data interaction module, and processes touch commands received by the first touch screen as well as data information received by the first data interaction module;
   the first data interaction module establishes a communication link with the second data interaction module, sends data information displayed on the first touch screen to the second data interaction module, and receives touch commands, which are sent by the second data interaction module and received by a second touch screen;
   the display device includes a second NFC module, a second microprocessor, a second touch screen and a second data interaction module, wherein the second microprocessor is connected with the other three parts respectively;
   the second NFC module senses the first NFC module within the surrounding area, transmits address parameters with the connected first NFC module, and sends the received address parameters to the second microprocessor;
   the second touch screen magnifies and displays the received data information that is displayed on the first touch screen, receives commands from external touch, and sends the received touch commands to the second microprocessor;
   the second microprocessor controls the second data interaction module to establish a communication link with the first data interaction module based on the received address parameters, and analyzes and processes touch commands received by the second touch screen;
   the second data interaction module sends touch commands that are received by the second touch screen and processed by the second microprocessor to the first data interaction module, and receives data information, which is displayed on the first touch screen and sent by the first data interaction module;
   the first touch screen and the second touch screen achieve real-time synchronization between the displayed data and touch commands through a communication link established by the first data interaction module and the second data interaction module.

2. The data interactive display system of claim 1, wherein the address parameters transmitted between the first NFC module and the second NFC module are the address parameters of the first data interaction module and the second data interaction module.

3. The data interactive display system of claim 1, wherein the first data interaction module and the second data interaction module adopt WiFi or Bluetooth wireless communication protocol.

4. The data interactive display system of claim 1, wherein the size of the second touch screen of the display device is bigger than that of the first touch screen of the smart wearable terminal.

5. The data interactive display system of claim 1, wherein the display device charges the smart wearable terminal through its charging port or the second NFC module.

6. The data interactive display system of claim 2, wherein the first data interaction module and the second data interaction module adopt WiFi or Bluetooth wireless communication protocol.

7. A data interactive display method based on a data interactive display system, wherein the data interactive display system comprises a smart wearable terminal and a display device, wherein the smart wearable terminal and the display device have interactive data communication;

the display device is merely taken as a screen for display;

the smart wearable terminal is equipped with operating system;

computing and processing of all touch commands and execution of actions are completed by the smart wearable terminal;

the smart wearable terminal includes a first NFC module, a first microprocessor, a first touch screen and a first data interaction module, wherein the first microprocessor is connected with the other three parts respectively;

the first NFC module senses a second NFC module within the surrounding area, transmits address parameters with the connected second NFC module, and sends the received address parameters to the first microprocessor, thereby ensuring the smart wearable terminal to match with the display device;

the first touch screen receives commands from external touch, and displays data information;

the first microprocessor controls the first data interaction module to establish a communication link with a second data interaction module based on the received address parameters, sends data information displayed on the first touch screen to the second data interaction module, and processes touch commands received by the first touch screen as well as data information received by the first data interaction module;

the first data interaction module establishes a communication link with the second data interaction module, sends data information displayed on the first touch screen to the second data interaction module, and receives touch commands, which are sent by the second data interaction module and received by a second touch screen;

the display device includes a second NFC module, a second microprocessor, a second touch screen and a second data interaction module, wherein the second microprocessor is connected with the other three parts respectively;

the second NFC module senses the first NFC module within the surrounding area, transmits address parameters with the connected first NFC module, and sends the received address parameters to the second microprocessor;

the second touch screen magnifies and displays the received data information that is displayed on the first touch screen, receives commands from external touch, and sends the received touch commands to the second microprocessor;

the second microprocessor controls the second data interaction module to establish a communication link with the first data interaction module based on the received address parameters, and analyzes and processes touch commands received by the second touch screen;

the second data interaction module sends touch commands that are received by the second touch screen and processed by the second microprocessor to the first data interaction module, and receives data information, which is displayed on the first touch screen and sent by the first data interaction module;

the first touch screen and the second touch screen achieve real-time synchronization between the displayed data and touch commands through a communication link established by the first data interaction module and the second data interaction module, wherein the data interactive display method comprising the steps of:

step 1: matching the smart wearable terminal with the display device;

step 2: activating the first data interaction module and the second data interaction module, and ensuring them to establish a communication link;

step 3: the smart wearable terminal, sending real-time data information displayed on the first touch screen to the display device through the communication link;

step 4: the second touch screen of the display device, magnifying and displaying the received data information that is displayed on the first touch screen;

step 5: the second touch screen, receiving and sending commands from external touch to the second microprocessor for analysis and processing, and then the second microprocessor transmitting the processed touch commands to the smart wearable terminal through the communication link; and step 6: the smart wearable terminal, executing corresponding commands and actions according to the received touch commands transmitted from the display device, and then returning to step 3.

8. The data interactive display method of claim 7, further comprising:

the smart wearable terminal identifying whether the communication link is connected in real time, and if the communication link is connected, the smart wearable terminal and the display device keeping interactive data communication, and if the communication link is disconnected, the smart wearable terminal controlling the first data interaction module to stop transmitting data information displayed on the first touch screen.

9. The data interactive display method of claim 7, wherein the step 1 further includes:

keeping the smart wearable terminal close to the display device, and ensuring the first NFC module and the second NFC module to establish a quick connection to transmit parameters that are necessary for connecting to WiFi or Bluetooth.

10. The data interactive display method of claim 7, wherein the size of the second touch screen of the display device is bigger than that of the first touch screen of the smart wearable terminal, and wherein the step 4 further includes:

the display device magnifying and encoding the received data information that is displayed on the first touch screen through the second microprocessor, ensuring the data information to accord with what is displayed on the second touch screen, thereby the data information displayed on the first touch screen is magnified.

* * * * *